Sept. 9, 1969 L. M. FINCH 3,466,227
BLAST SHIELD FOR NUCLEAR REACTOR
Filed Sept. 22, 1967 2 Sheets-Sheet 1

INVENTOR.
Lester M. Finch
BY
Attorney

Sept. 9, 1969
L. M. FINCH
3,466,227
BLAST SHIELD FOR NUCLEAR REACTOR
Filed Sept. 22, 1967
2 Sheets-Sheet 2
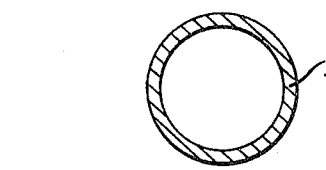
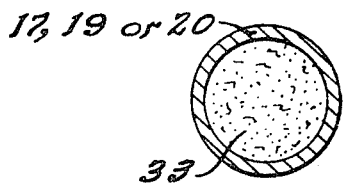
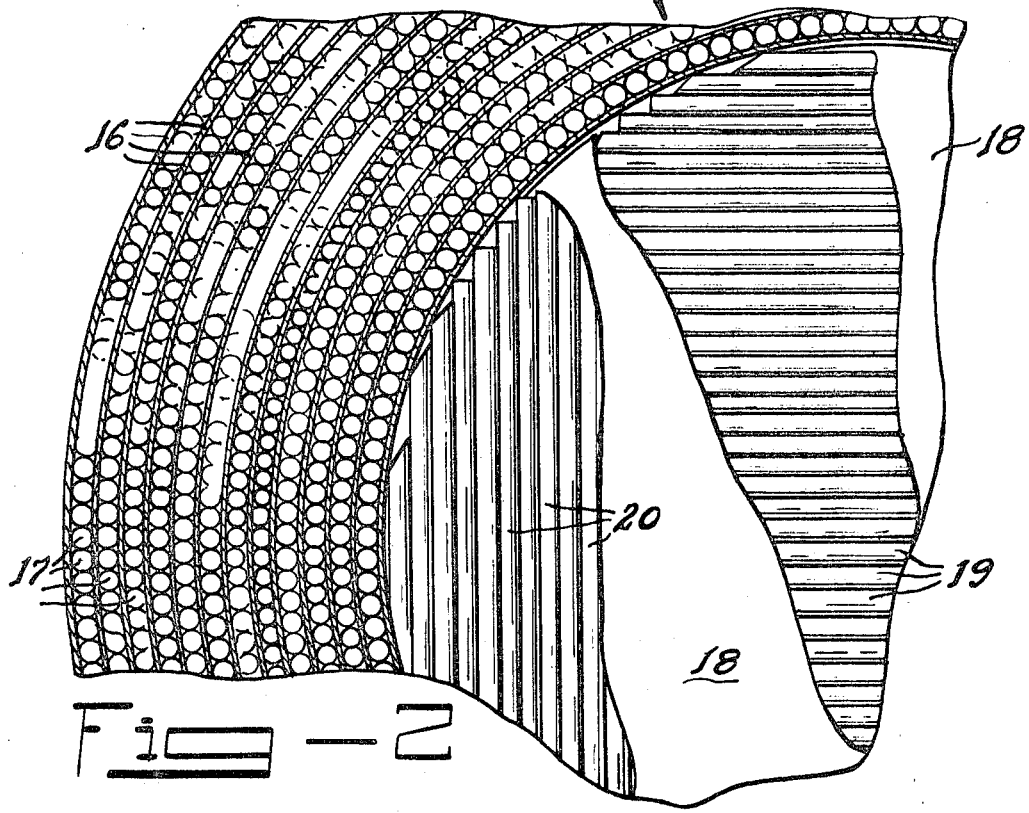
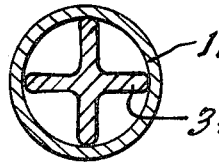
INVENTOR.
Lester M. Finch
BY
Attorney United States Patent Office 3,466,227
Patented Sept. 9, 1969

3,466,227
BLAST SHIELD FOR NUCLEAR REACTOR
Lester M. Finch, Pasco, Wash., assignor to the United States of America as represented by the United States Atomic Energy Commission
Filed Sept. 22, 1967, Ser. No. 669,957
Int. Cl. G21c 9/00, 11/00
U.S. Cl. 176—87   3 Claims

ABSTRACT OF THE DISCLOSURE

Energy-absorbing blast shield for fast-reactor core. The core is surrounded by a plurality of nested, radially spaced cylinders and by a plurality of tubes between the cylinders. Beneath the core lie sets of tubes and flat sheets separating the sets of tubes.

CONTRACTUAL ORIGIN OF THE INVENTION

The invention described herein was made in the course of, or under, a contract with the United States Atomic Energy Commission.

BACKGROUND OF THE INVENTION

This invention relates to a blast shield. More specifically, the invention relates to an energy-absorbing shield for a fast reactor.

When a nuclear incident such as an explosion occurs in a nuclear reactor, it is very important that there be no break in the container of the nuclear reactor, in spite of high localized loading due to the explosion. I have invented a blast shield that provides a high degree of resilient support, thus minimizing the possibility of localized premature failure of the shield.

According to my present invention, I provide a plurality of nested radially spaced cylinders about a reactor core and a plurality of tubes in the spaces between the shells, which tubes may desirably be filled with a mixture of graphite and a poison or with stiffening spiders. Below the reactor core, I provide plates and tubes spacing the plates from one another, which tubes may optionally be filled with stiffening spiders or a mixture of graphite and a poison.

BRIEF DESCRIPTION OF THE DRAWINGS

In the drawings:

FIG. 2 is a fragmentary horizontal sectional view taken on the line 2—2 of FIG. 1;

FIG. 3 is a transverse sectional view of a tube forming part of the present shield, the tube being free of filler or stiffener;

FIG. 4 is a transverse sectional view of the said tube containing a filler; and

FIG. 5 is a transverse sectional view of the tube containing a stiffening spider.

DESCRIPTION OF THE PREFERRED EMBODIMENT

Figure 1:
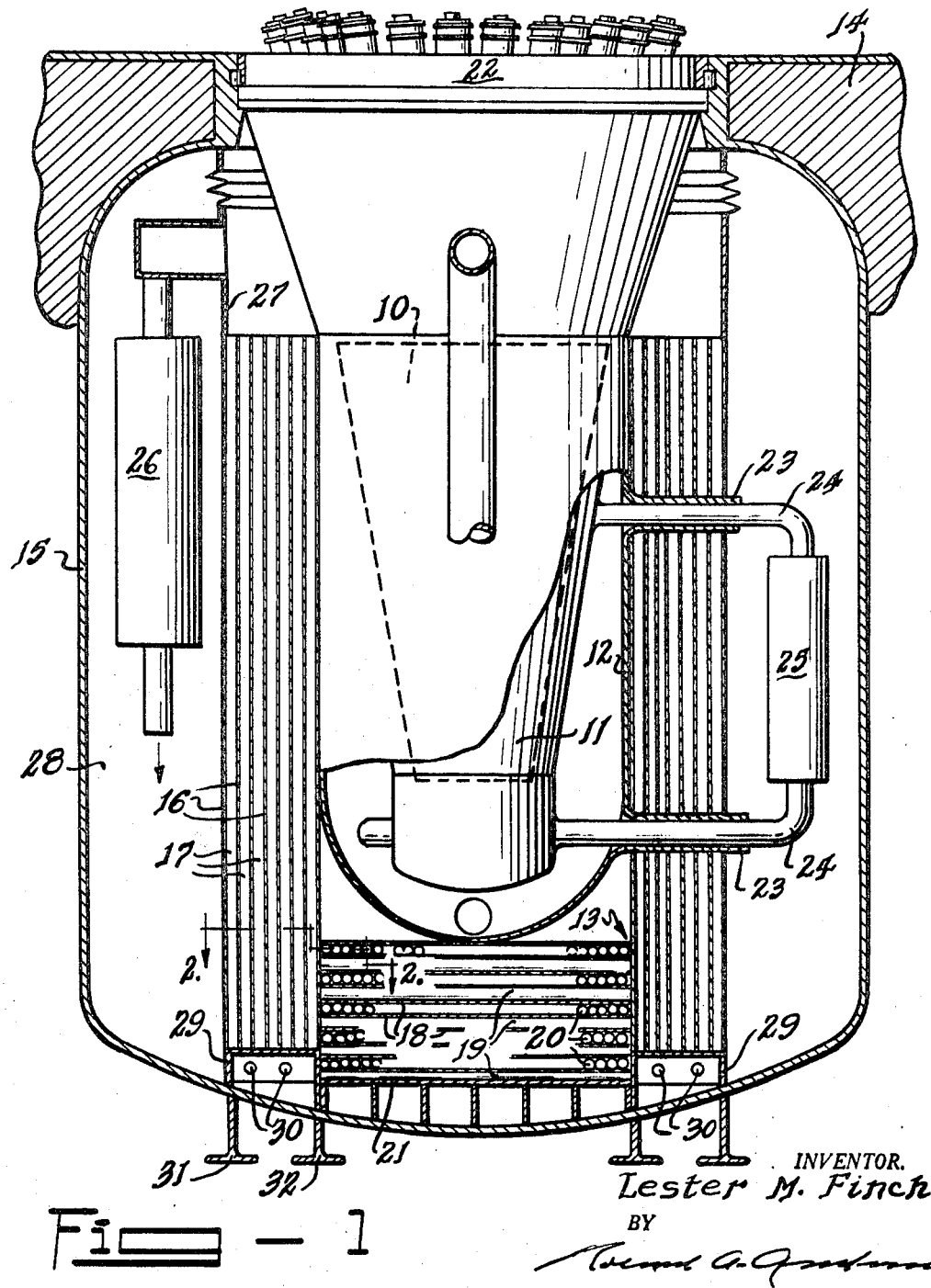
FIG. 1 is a vertical sectional view showing the blast shield of the present invention about a nuclear reactor.

As shown in FIG. 1, a nuclear reactor comprises a core 10, a reactor vessel 11, a shroud vessel 12, a blast shield 13 of the present invention, a concrete structure 14, and a liner 15. The reactor vessel 11 surrounds the core 10 and is in turn surrounded by the shroud vessel 12. The blast shield 13 lies outside of the shroud vessel 12 and within the concrete structure 14. The liner 15 is applied to the interior of the concrete structure 14.

The sides of the blast shield 13 are formed of a plurality of relatively large, nested, radially spaced, circular, coaxial cylinders 16 and a plurality of relatively small tubes 17 located in the spaces between the cylinders 16 and having diameters about equal to the radial dimensions of the spaces between the cylinders 16. The axes of the tubes 17 are parallel to the axes of the cylinders 16 and fill the spaces between the cylinders in the sense that the tubes between each set of adjacent cylinders 16 are tangent to one another all about these cylinders.

The base of the blast shield 13 is formed of a plurality of parallel flat circular plates 18 and a plurality of tubes 19 and 20 lying between the plates 18 so as to space them from one another in a direction along the axes of the cylinders 16. The diameter of the plates 18 is about equal to the inner diameter of the innermost cylinder 16. All the tubes 19 or 20 lying between two adjacent plates 18 or between the lowest plate 18 and a bottom support 21 are considered to comprise a set. The tubes 19 alternate in sets with the tubes 20 in a vertical direction or in a direction along the axes of the cylinders 16. Thus when considered in a downward direction in FIG. 1, tubes 19 form the first, third, fifth, etc. sets, and tubes 20 form the second, fourth, sixth, etc. sets. The tubes 19 or 20 of any set are parallel to one another and vary in length from a minimum at one side of the innermost cylinder 16 to a maximum and back to a minimum at the other side of the innermost cylinder. The tubes 19 extend transversely to the tubes 20.

The reactor may be a fast-flux test reactor in which the core 10 is shaped like the frustum of a cone, so that core portions of the fuel elements thereof are quite close to one another and the upper ends are more spaced from one another than are the core portions. Consequently, the upper ends of the fuel elements extend through individual openings in a cover 22, with the result that various of the fuel elements may be individually replaced without involving other fuel elements, as is desirable in a test reactor. The core 10 may have, in transverse section, the shape of a regular hexagon.

As shown in FIG. 1, the cylinders 16 have openings at one side through which extend tubular members 23 connected with openings in the side of the shroud vessel 12. Tubes 24, which extend through the tubular members 23, are connected with side openings in the reactor vessel 11 and with a gas-circulator-cooler 25, which supplies gas for cooling the reactor core 10.

The shield 13 is cooled by gas supplied by a gas-circulator-cooler 26, one end of which is connected with a shell 27, one end of which is sealed to the outermost cylinder 16, and the other end, to the containment liner 15. The end of the gas-circulator-cooler 26 opposite the end connected to the shell 27 is open to an annular space 28 bounded by the containment liner 15, the shell 27, the outermost cylinder 16, and an annular header 29. The header 29 is beneath the cylinders 16 and tubes 17 so as to support them and has openings 30, which admit gas from the space 28 to the header 29. The header 29 also has on its inner side openings (not shown) that allow gas to flow from the header to the plates 18 and tubes 19 and 20. Openings (not shown) in the plates 18 allow the gas to flow upwards through the plates 18 and over the tubes 19 and 20. Openings (not shown) in the top of the header 29 permit the gas to flow upward through and over the cylinders 16 and tubes 17.

The load of the cylinders 16 and tubes 17 is transmitted through the header 29 and the base of the containment liner 15 to ring-shaped structures 31 and 32 of inverted-T-section embedded in the concrete structure 14.

As shown in FIG. 3, each of tubes 17, 19, and 20 is empty and free of filling or interior support.

As shown in the modification of FIG. 4, each of tubes 17, 19, and 20 contains a filling 33 formed, for example, of a mixture of boron and graphite.

As shown in the modification of FIG. 5, each of tubes 17, 19, and 20 contains stiffening spiders 34, which are metallic and have a plurality of radial legs extending the length of the tubes. The spider 34 may be a single unit extending the length of the tube or may be formed in sections laid end to end.

The tubes 17, 19, and 20, the cylinder 16, and the plates 18 are preferably formed of a low-carbon steel having high ductility.

The hypothetical accidents postulated for fast-neutron reactors during a nuclear excursion typically involve the release of large amounts of energy in a nearly explosive manner. The energy-absorbing advantages of the present invention comprising the cylinders 16, plates 18, and tubes 17, 19, and 20, are based upon the high specific strain energy (to rupture) of the cylinders, plates, and tubes, because they are formed, for example, of low-carbon steel having high ductility. In the present arrangement of cylinders 16, plates 18, and tubes 17, 19, and 20, particularly, the nested arrangement of cylinder 16 and tubes 17, there is provided a continuous structural system allowing uniform loading of all elements in a progressive manner.

Each successive cylinder 16 receives it loading from the adjacent inner cylinder 16 through tubes 17 and is supported in turn by the adjacent outer cylinder 16 through tubes 17. Because of the high degree of resilient support, the possibility of localized, premature failure or blowout of any cylinder 16 is minimized. The progressive loading in a radially outward direction requires that each cylinder 16 deform elastically and then plastically and finally rupture in nearly tensile loading. The tubes 17 not only absorb energy by instability collapse, but also transmit blast load continuously through the structure and control local strain necking by surface friction. Thus, rupture of a given cylinder 16 is prevented before a large fraction of the cylinder has received its full deformation.

It is also understood that the invention is not to be limited by details given herein but that it may be modified within the scope of the appended claims.

The embodiments of the invention in which an exclusive property or privilege is claimed are defined as follows:

1. A shield for a nuclear-reactor core comprising a plurailty of large nested cylinders surrounding the core, there being radial spaces between the cylinders, a plurality of small tubes located in the radial spaces between the cylinders, the diameter of the tubes located in each radial space being about equal thereto, the axes of the tubes being parallel to those of the cylinders and further comprising a plurality of stiffening spiders located in the tubes.

2. The shield specified in claim 1, the cylinders and tubes extending beyond the bottom of the reactor core, the shield further comprising a plurality of flat plates located below the bottom of the reactor core within the cylinders and tubes and conforming generally to the interior of the innermost cylinder, and a further plurality of sets of small tubes located between the plates so as to space them from one another in a direction along the axes of the cylinders, the set of tubes between any two adjacent plates extending side by side and progressing from a minimum in length through a maximum back to a minimum from one side of the innermost cylinder to the opposite side, each set of tubes extending transversely to the adjacent set of tubes.

3. The shield specified in claim 2 and further comprising a plurality of stiffening spiders provided in the tubes located between the plates.

References Cited

UNITED STATES PATENTS

| 3,113,089 | 12/1963 | Nagey et al. | 250—108 |
| 3,175,958 | 3/1965 | Bourgade | 176—87 |

FOREIGN PATENTS

| 1,034,375 | 6/1966 | Great Britain. |
| 1,429,959 | 1/1966 | France. |

REUBEN EPSTEIN, Primary Examiner

U.S. Cl. X.R.

250—108